Dec. 27, 1938.  N. S. LUNDBERG ET AL  2,141,191
MILLING MACHINE
Filed Oct. 26, 1935
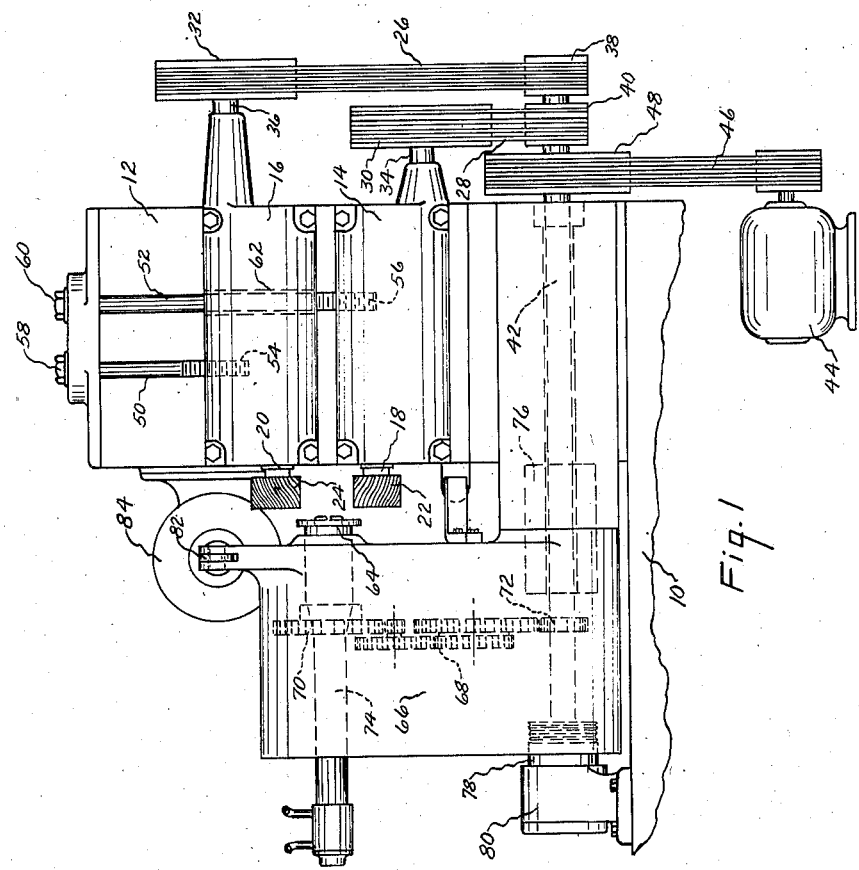
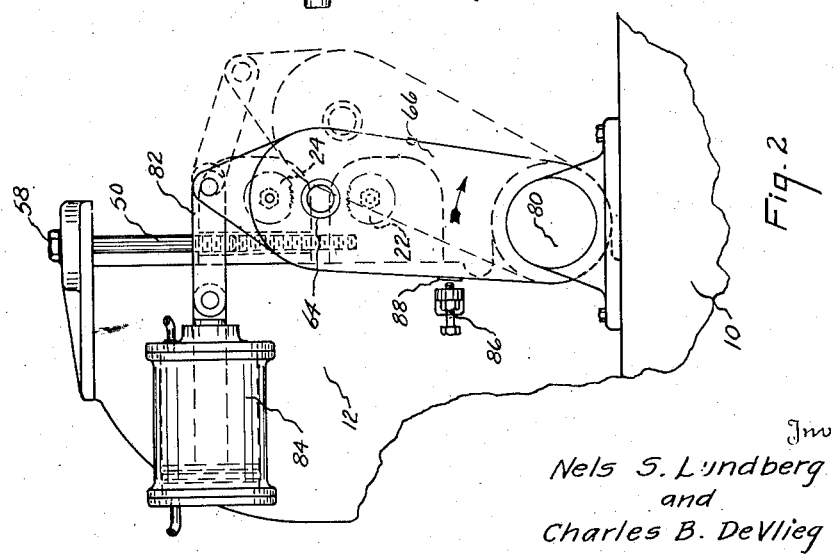
Inventor
Nels S. Lundberg
and
Charles B. DeVlieg
By Beamer + Langford
Attorney Patented Dec. 27, 1938

2,141,191

UNITED STATES PATENT OFFICE 2,141,191

MILLING MACHINE

Nels S. Lundberg and Charles B. De Vlieg, Jackson, Mich., assignors, by mesne assignments, to The Bullard Company, Bridgeport, Conn.

Application October 26, 1935, Serial No. 46,878

10 Claims. (Cl. 90—20)

The present invention relates to improvements in Milling machines of the "turnmilling" type as disclosed in our copending application Ser. No. 29,834, filed July 5, 1935, Patent No. 2,036,967, April 7, 1936.

In lieu of rotating the work about a fixed axis of rotation and feeding the opposed milling cutters into the work as disclosed in the aforesaid application, the present invention contemplates the mounting of the cutters in fixed spaced relation and feeding the work into the cutters. As illustrated, the tool carriages are supported for relative adjustment upon the frame of the machine and the work holding and rotating structure is pivoted about an axis parallel to its axis of rotation of the milling cutters to feed the work into and between the cutters.

One of the objects of the invention is to provide a milling machine of simple construction capable of high production.

Another object is to provide a milling machine in which the mechanism for effecting relative feed between the cutter and the work is greatly simplified structurally and functionally over prior practice.

A further object is to provide improvements in a method of turn milling in which the depth of cut is determined by the extent of feed of the work into and between opposed cutters.

A still further object is to provide a milling machine for milling work to circular cross section which may be readily loaded and unloaded either manually or automatically.

These and other objects residing in the combination and arrangement and construction of parts will be more fully treated in the description to follow and will become readily apparent when considered in connection with the accompanying drawing wherein a single embodiment of the invention is shown.

In the drawing,

Fig. 1 is a fragmentary side elevational view of a milling machine embodying the principles of construction and operation of the present invention, and Fig. 2 is a fragmentary end view taken from the left of Fig. 1 of the work rotating and holding structure.

The bed 10 of the machine may take any suitable form and is shown as having a vertical column 12 upon which the tool carriages 14 and 16 are rigidly supported and guided for relative adjustment. The driving mechanism located within these carriages may be identical with that shown in our copending application above mentioned. As shown, the tool spindles 18 and 20 carry milling cutters 22 and 24; the spindles 18 and 20 being driven through belts 26 and 28 running over pulleys 30 and 32 splined to shafts 34 and 36 suitably geared to the spindles. The belts 26 and 28 pass over pulleys 38 and 40 splined to the main driving shaft 42 which is driven by the motor 44 through the belt 46 and pulley 48. Each of the tool carriages is firmly supported for vertical movement in suitable guideways (not shown) and are adjusted relative to each other by adjustment screws 50 and 52 threaded into the carriages 14 and 16 at 54 and 56; the screws 50 and 52 being rotated in either direction through engagement of the heads 58 and 60 by a suitable tool. It will be noted that the screw 52 passes through a bore 62 in the carriage 16 in order to coact with the carriage 14. This arrangement makes it possible to relatively adjust the cutters 22 and 24 for different diameter work and different machining operations.

The structure for chucking and rotating the work comprises a work holder 64 supported for rotation in the swinging frame 66. As shown the holder 64 is rotated by a gear train 68 which meshes with a gear 70 upon the work holder spindle 74 and a gear 72 upon the main driving shaft 42. If desired, the same structure may be employed in the present invention for the manipulation of the holder 64 as disclosed in our aforesaid application. The frame 66 is supported for swinging movement upon the stub shafts 76 and 78 one of which is supported in the main bed of the machine while the other is supported in the bracket 80.

While the supporting structure 66 for the work holder is shown as movable about a fixed pivot, it is within the contemplation of the present invention to support the work holder for linear movement, or otherwise, with respect to the cutters.

The structure for moving the work holder supporting frame 66 may take various forms. As shown, a cylinder and piston arrangement 84 is provided with a link 82 which is attached to the frame 16. Through suitable valve and control mechanism (not shown) the frame 66 may be hydraulically fed, from the dotted line position in Fig. 2 to the full line position and returned. An adjustable stop 86 contacting with a plate 88 in the frame 66 may be employed to limit the feed of the work holder 64 toward and between the cutters 22 and 24. It should be apparent that the depth to which the work piece will be machined may be regulated through either adjustment of the stop 86 or the spacing of the cutters 22 and 24.

Generally, the stop 86 is employed to position the axis of the work holder 64 in the center line of the cutters 22 and 24. Then by regulating the spacing of the cutters 22 and 24, the desired finished diameter of the work piece may be obtained. As the cutter wears, the same can be brought closer together by adjusting the screws 50 and 52. The work piece may be continuously rotated with the milling cutters as disclosed in the aforesaid application or first fed to depth between the cutters and then rotated as disclosed in our application Ser. No. 58,247 filed January 9, 1936. When the work piece is first fed to depth to position the axis of the work holder in the center line of the cutter and then rotated, it will be clearly understood that each cutter tends to support the work piece against the cutting action of the other cutter. This is likewise true where the cutters and work pieces are continuously rotated during the entire cutting operation, especially when the depth of cut to be taken is relatively light enabling the initial cutting action to take place upon substantially opposed cutting areas of the rotated cutters. This supporting action of the opposed cutters coupled with the ability to rigidly construct and feed the frame 66 makes possible high production as more fully discussed in our aforesaid earlier application. When the work piece is to be fed to depth and then rotated, any suitable conventional clutch may be included in the gear train 68 or interposed between the shaft 42 and the gear train 68. While a tail stock is not illustrated in connection with the work holder 64, one may be supported from the frame 66 in any suitable manner when the shape of the work piece or the necessity for additional rigidity requires the use of such a structure.

The design of the foregoing described structure is such that it may be readily loaded and unloaded manually or automatically. This is because the work holder moves bodily away from the cutter and all difficulties connected with loading and unloading the work between the cutters is avoided. As a further result the construction of the machine is materially simplified.

Having described our invention, what we claim and desire to protect by Letters Patent is:

1. In a machine tool, a pair of tool carriages supported in vertical spaced relation, milling cutters supported in said carriages in spaced opposed relationship, an oscillatable member, a work holder carried by said member for presenting work to and between said cutters, and means for swinging said member toward said cutters to feed the work into the same.

2. In a machine tool, a pair of tool carriages supported in vertical spaced relation, milling cutters supported in said carriages in spaced opposed relation for rotation, a member oscillatable about an axis parallel to the axis of rotation of said cutters, a work holder associated with said member and adapted to present the work to and between said cutters, and means connected to said member for feeding the same toward said cutters.

3. In a machine tool, a pair of fixed side milling cutters, a work holder, means for supporting said holder for movement toward said cutters, means for rotating said holder in said first means, means for feeding said first means toward said cutters, means for limiting the feed of said last means to position a work piece in said holder in the center line of said cutters, the center of said cutters being spaced to cut the work to the desired depth when located in said position.

4. In a machine tool, a pair of spaced side milling cutters relatively fixed with respect to each other, a rotatable work holder, means supporting said holder and cutters for relative movement toward each other, means for effecting a relative feeding movement between the supporting means for said holder and cutters, means for limiting said movement to position a work piece in said holder with its axis of rotation in the center line of said cutters, the centers of said cutters being spaced to cut the work to the desired depth when located in said position.

5. In a machine tool, a pair of spaced rotatable milling cutters adapted to be held in fixed spaced relation with respect to each other during the cutting operation, a rotatable work holder, means for supporting said holder, means for effecting a relative feeding movement between said cutters and holder, means for limiting the relative feeding movement between said cutters and holder, said holder being so located with respect to said cutters whereby the work in said holder is disposed between and simultaneously acted upon by said cutters and the depth of cut thereof being regulated by the spacing of said cutters and the limit of relative feed between said cutters and the work with reference to the center line of said cutters.

6. In a machine tool, spaced milling cutters fixedly located with respect to the work, means for rotating said cutters, said cutters being disposed in the same general plane of rotation so as to machine the same portions of a work piece presented thereto and rotated between said cutters, a work holder, a frame structure mounted for oscillation about a fixed axis supporting said work holder for swinging movement to and from said cutters, means to feed the work into said cutters, and means for rotating said work holder.

7. In a machine tool, a pair of fixedly supported side milling cutters being disposed in the same general plane of rotation so as to machine the same portions of a work piece presented thereto and rotated between said cutters, a work holder, a swinging frame in which said holder is supported, said frame and holder being so positioned relative to said cutters that said holder traverses an arcuate path passing between the spaced axes of rotation of said cutters, means for feeding said frame to move said holder between said cutters, the work piece being loaded in said holder at one end of said arcuate path and presented to said cutters at the other end.

8. In a machine tool, a pair of fixed milling cutters, a work holder, means for supporting said holder for movement toward said cutters, means for rotating said holder in said first means, means for feeding said first means toward said cutters, means to position a work piece in said holder in the center line of said cutters, the center of said cutters being spaced to cut the work to the desired depth when located in said position.

9. In a machine tool, a pair of spaced milling cutters relatively fixed with respect to each other, a rotatable work holder, means supporting said holder and cutters for relative movement toward each other, means for effecting a relative feeding movement between the supporting means for said holder and cutters, means to position a work piece in said holder with its axis of rotation in the center line of said cutters, the centers of said cutters being spaced to cut the work to the desired depth when located in said position.

10. In a machine tool, a pair of spaced rotatable milling cutters adapted to be held in fixed spaced relation with respect to each other during the cutting operation, a rotatable work holder, means for supporting said holder, means for effecting a relative feeding movement between said cutters and holder, said holder being so located with respect to said cutters whereby the work in said holder is disposed between and simultaneously acted upon by said cutters and the depth of cut thereof being regulated by the spacing of said cutters and the limit of relative feed between said cutters and the work with reference to the center line of said cutters.

NELS S. LUNDBERG.
CHARLES B. DE VLIEG.